Patented Sept. 12, 1939

2,172,954

UNITED STATES PATENT OFFICE 2,172,954

CHLORINATED DIPHENYL SULPHIDE

Frank M. Clark, Pittsfield, Mass., assignor to General Electric Company, a corporation of New York No Drawing. Application April 10, 1937, Serial No. 136,149

2 Claims. (Cl. 260—609)

The present invention comprises a new liquid composition of chlorinated diphenyl sulphide which is suitable for use as an insulating and dielectric composition and as an ingredient for lubricants, as will be hereinafter more fully explained. In particular, my new composition comprises a mixture of isomers of chlorinated compounds of diphenyl sulphide in which tetrachlor compounds of such sulphide are predominant.

Diphenyl sulphide is a liquid which boils at a temperature of about 290 to 295° C. and which solidifies or freezes at about —40° C. It may be obtained from commercial sources as a by-product of petroleum refining, or which may be made synthetically from benzene. When diphenyl sulphide is chlorinated in the presence of a catalyst, such for example as iron or antimony, present either in a metallic state or in the form of a chloride, a series of chlorinated products is obtained varying from the monochlor to the heptachlor compounds, the degree of chlorination depending on the various conditions of the reaction, principally, on the time of the reaction and the temperature. In employing a well known form of chlorination apparatus, the tetrachlor product is obtainable after about 9 hours of chlorination, the reaction being carried out at a temperature of about 100 to 135° C. Such tetrachlor product consists of a mixture of isomers and may be associated with some lower and some higher products of chlorination. When the tetrachlor diphenyl sulphide product is treated to remove catalyst and impurities, such as hydrogen chloride, and unstable compounds which may be present, a liquid is obtained which has a pour point of about —10° C. and boils at a pressure of about 25 mm. of mercury within the range of 235-265° C. Purification may be effected by neutralizing the product in an aqueous solution of alkali and finally subjecting the same to fractional distillation, preferably under a reduced pressure, 25 mm. of mercury being satisfactory.

The purified chlorination product obtained under these conditions has a viscosity of 37.8° C. of 142 seconds, a specific gravity at 15.5° (referred to water at the same temperature) of 1.48, and a dielectric constant at 1000 cycles, 100° C. of 4.2. Its refractive index at 25° C. is 1.6585. This product is particularly well adapted for use as a cooling and insulating medium, or as a dielectric material, in electrical devices, such as transformers, cables, capacitors, and the like.

The viscosity, low pour point, non-inflammability and chemical inertness of liquid tetrachlor diphenyl sulphide with respect to metals ordinarily used in electrical apparatus renders it particularly well adapted for such purposes. For example, electric capacitors consisting of aluminum armatures and interposed absorbent dielectric material consisting of three sheets of kraft paper having a thickness of .0003", when impregnated therewith had an unusual high capacity, requiring only six square feet of electrode surface per microfarad. Capacitors of the same character and consisting of the same elements when impregnated with mineral oils or mineral wax required an active electrode area of approximately ten square feet. The power factor of capacitors so impregnated at 60 cycles, 25° C. was about .34 per cent. When such capacitors were operated at 75° C., the capacity was decreased only about 1.5 per cent and the power factor remained substantially unchanged, increasing only to about .37 per cent.

No substantial change occurs in the electrical properties of such capacitors, which have been impregnated with tetrachlor diphenyl sulphide even when operated at an ambient temperature of 75° at a voltage of 245 volts in the presence of air for a period of 3 months.

As already indicated above, the tetrachlor diphenyl sulphide composition advantageously may be added to hydrocarbon oil lubricants. For example, a lubricating hydrocarbon oil obtained commercially under the designation SAE-40 has a maximum safe load carrying capacity of 5,000 to 7,000 pounds per square inch bearing surface. The addition of .5 per cent of the described tetrachlor diphenyl sulphide raises the maximum load-carrying capacity to about 13,600 pounds per square inch. The addition of 1 per cent of this product further raises the load-carrying capacity to about 14,800 pounds per square inch.

The tetrachlor diphenyl sulphide which is herein described may be employed as a constituent of compositions including other chlorinated aromatic compounds. It may, for example, be employed in combination with various chlorinated polyphenyl compounds described or mentioned in my prior Patent No. 1,999,004 of April 23, 1935.

In a copending application Serial No. 136,126 filed April 10, 1937, claims have been made on electric devices containing dielectric materials comprising as an essential ingredient halogenated polyphenyl sulphide.

What I claim as new and desire to secure by Letters Patent of the United States is:

1. A liquid composition of matter comprising essentially a mixture of isomers of tetrachlor diphenyl sulphide.

2. A composition of matter comprising essentially tetrachlor diphenyl sulphide; said composition being a liquid having a pour point of about —10° C., a viscosity at 37.8° C. of 142 seconds, a specific gravity at 15.5° of 1.48, referred to water at the same temperature, and a dielectric constant of 4.2 at 1,000 cycles 100° C.

FRANK M. CLARK.